(12) United States Patent
Yokoyama

(10) Patent No.: US 7,852,126 B2
(45) Date of Patent: Dec. 14, 2010

(54) TRANSMISSION APPARATUS AND METHOD

(75) Inventor: Junnosuke Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1346 days.

(21) Appl. No.: 11/275,985

(22) Filed: Feb. 8, 2006

(65) Prior Publication Data

US 2006/0181733 A1    Aug. 17, 2006

(30) Foreign Application Priority Data

Feb. 16, 2005    (JP)    ............... 2005-039520

(51) Int. Cl.
*H03B 1/00*    (2006.01)
*H04L 27/00*    (2006.01)

(52) U.S. Cl. .................. 327/112; 327/108; 327/526; 375/295; 375/229; 375/219; 358/1.15; 326/83

(58) Field of Classification Search .......... 327/65, 327/112, 108, 526; 375/226, 229, 296, 316, 375/340, 358, 219, 295, 233, 346; 326/82, 326/83, 86

See application file for complete search history.

(56) References Cited

U.S. PATENT DOCUMENTS

| | | | |
|---|---|---|---|
| 6,940,302 B1 * | 9/2005 | Shumarayev et al. | 326/26 |
| 7,092,312 B2 * | 8/2006 | Choi et al. | 365/189.14 |
| 7,164,299 B2 * | 1/2007 | Nedachi | 327/112 |
| 7,323,907 B1 * | 1/2008 | Ku et al. | 326/82 |
| 7,570,714 B2 * | 8/2009 | Hori et al. | 375/317 |
| 7,583,753 B2 * | 9/2009 | Okamura | 375/296 |
| 2002/0031257 A1 | 3/2002 | Kato | 382/165 |

FOREIGN PATENT DOCUMENTS

| | | |
|---|---|---|
| JP | 63-156437 | 6/1988 |
| JP | 04-315321 A | 11/1992 |

\* cited by examiner

*Primary Examiner*—Vibol Tan
(74) *Attorney, Agent, or Firm*—Fitzpatrick Cella, Harper & Scinto

(57) ABSTRACT

A pre-emphasis circuit to emphasize edges of transmission data is controlled in correspondence with the result of analysis of the transmission data.

4 Claims, 8 Drawing Sheets

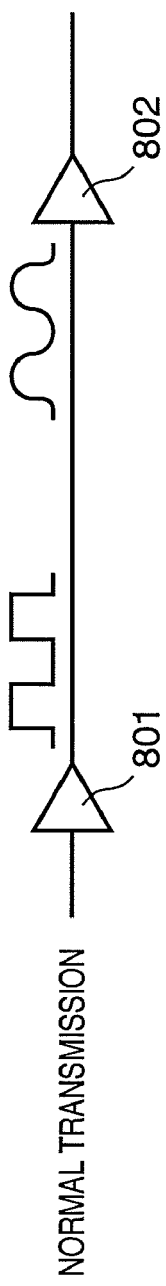
FIG. 8A  NORMAL TRANSMISSION
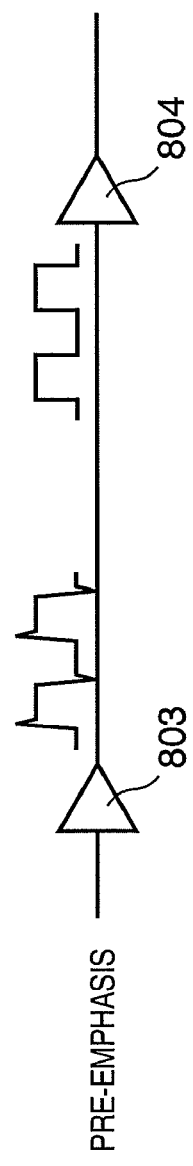
FIG. 8B  PRE-EMPHASIS

TRANSMISSION APPARATUS AND METHOD

FIELD OF THE INVENTION

The present invention relates to transmission apparatus and method for performing data transmission using a pre-emphasis technique.

BACKGROUND OF THE INVENTION

In signal transmission via a long-distance signal line, a pre-emphasis technique of amplifying the signal on the transmitting side and transmitting the amplified signal is known (for example, Japanese Patent Application Laid-Open No. 63-156437).

FIGS. 8A and 8B are explanatory diagrams of the pre-emphasis technique. FIG. 8A illustrates a general transmission form, and FIG. 8B shows data transmission using the pre-emphasis technique. In FIG. 8A, reference numeral 801 denotes a driver of transmitting-side; and numeral 802 denotes a receiver. In this example, a signal transmitted as a rectangular wave from the driver 801 is received as a blunt (leading and trailing edges are rounded) signal by the receiver 802.

On the other hand, in FIG. 8B, a signal inputted into a driver 803 is previously subjected to edge emphasis. Then a signal outputted from the driver 803 is received by a receiver 804 as a signal close to the original rectangular wave signal. In this manner, on the transmitting side, the edge emphasis is performed on a signal before the signal is transmitted, thereby the waveform quality on the receiving side can be improved.

Particularly, when serial data transmission/reception is performed for the sake of reduction of the number of signal lines, to transmit/receive larger amount of data, it is necessary to increase a frequency for transmitting the serial data. However, upon transmitting the serial data via a long-distance signal line, if the transmission frequency is increased, the blunting of the signal as shown in FIG. 8A appears as a shift from leading edge or trailing edge of a synchronizing clock, and there is a probability that accurate data transmission cannot be ensured.

Generally, on the transmitting side, signal amplification by pre-emphasis is performed and the amplified signal is transmitted as shown in FIG. 8B, thereby timing margin in the serial signal is ensured in the use of serial transmission method.

However, as the pre-emphasis amplifies high frequency components such as leading and trailing edges of a signal, radiation noise is generated, and electric consumption is increased by electricity amplification.

SUMMARY OF THE INVENTION

The present invention has its object to appropriately perform pre-emphasis.

Further, another object of the present invention is to reduce radiation noise of high frequency components and electric consumption.

Further, another object of the present invention is to provide a transmission apparatus comprising pre-emphasis means for emphasizing an edge of a signal corresponding to transmission data and control means for controlling the pre-emphasis means in correspondence with the transmission data.

Further, another object of the present invention is to provide a transmission method comprising a pre-emphasis step of emphasizing an edge of a signal corresponding to transmission data and a control step of controlling the pre-emphasis step in correspondence with the transmission data.

Further, other features and advantages of the present invention will be apparent from the following description taken in conjunction with the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A and 8B are explanatory diagrams showing a normal signal transmission and signal transmission using the pre-emphasis technique.

DETAILED DESCRIPTION OF THE PREFERRED EMBODIMENTS

Hereinbelow, preferred embodiments of the present invention will now be described in detail in accordance with the accompanying drawings. Note that the following embodiments do not pose any limitation on the claims of the invention, and all the combinations of the features described in the embodiments are not necessarily essential to solution means of the invention.

Figure 1:
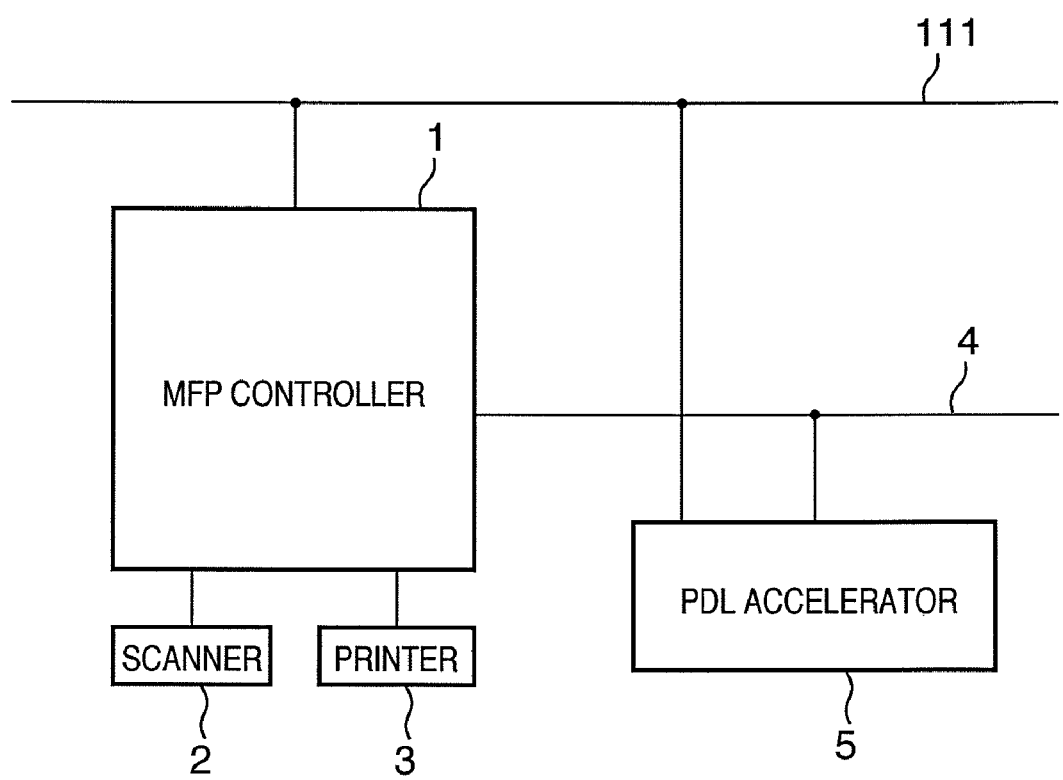
FIG. 1 is a block diagram showing a construction of an MFP (multi-function processor) according to embodiments of the present invention.

FIG. 1 is a block diagram showing a construction of an MFP (multi-function processor) according to embodiments of the present invention.

An MFP controller 1, connected to a scanner 2 and a printer 3, controls the operations of these units, thereby the MFP having a scanner function, a printer function, a copier function and the like, is realized. Note that in a case that the performance of print processing using PDL (Page Description Language) with only the MFP controller 1 is insufficient, a PDL accelerator 5 is externally connected via a PCI specialized bus 4. The PDL accelerator 5 analyzes PDL received from a network 111, expands the PDL to bitmap data, and outputs the bitmap data to the MFP controller 1 for high-speed print processing using PDL. The PDL accelerator 5 may be connected to the network 111, or not connected to the network 111. Since the processing speed of the MFP is not influenced when PDL data is directly received, the PDL accelerator 5 is connected to the network 111 in this example.

Figure 2:
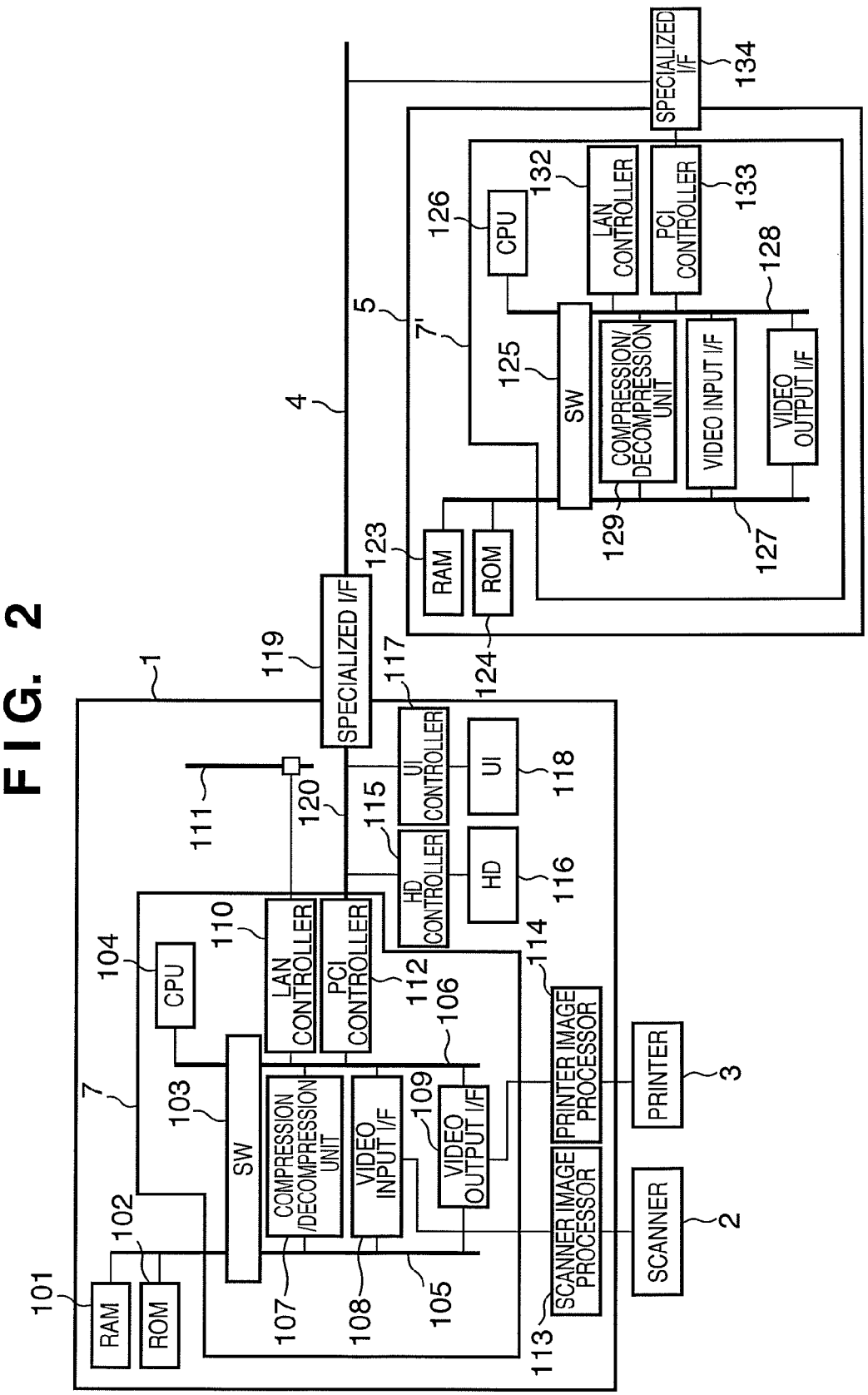
FIG. 2 is a block diagram showing detailed constructions of an MFP controller and a PDL accelerator according to the embodiments.

FIG. 2 is a block diagram showing detailed constructions of the MFP controller 1 and the PDL accelerator 5 according to the embodiments. The operations of the MFP controller 1 and the PDL accelerator 5 in FIGS. 1 and 2 will be described below.

When printing is instructed from a PC (not shown) connected to the network Ill and PDL print data is transmitted via the network 111, the PDL print data is temporarily stored in a RAM 101 of the MFP controller 1. The PDL print data is transferred via the network 111, a LAN controller 110, an IO bus 106 and a bus switch (SW) 103, to the RAM 101. The PDL print data, temporarily stored in the RAM 101, is stored into an HD 116 via the bus SW 103, the IO bus 106, a PCI controller 112, a PCI bus 120 and an HD controller 115.

Upon processing the PDL print data stored in the HD 116, the PDL print data is stored into the RAM 101 via the HD controller 115, the PCI bus 120, the PCI controller 112, the IO bus 106 and the bus SW 103. The PDL print data is developed to PDL code and stored into the RAM 101 by the CPU 104. The PDL code developed in the RAM 101 is inputted into the PDL accelerator 5. The PDL code is transferred to the PDL accelerator 5 via the bus SW 103, the IO bus 106, the PCI controller 112, the PCI bus 120, a specialized interface (I/F) 119, the PCI specialized bus 4 and a specialized I/F 134. The PDL code is then stored into a RAM 123 via a PCI controller 133, a video bus 127 and a bus SW 125. The PDL code in the RAM 123 is developed into bitmap data under the control of the CPU 126 and the bitmap data is stored into the RAM 123. The bitmap data stored in the RAM 123 is compressed by a compression/decompression unit 129 via the bus SW 125 and the video bus 127. The compressed bitmap data is stored into the RAM 123 via the video bus 127 and the bus SW 125. The compressed bitmap data stored in the RAM 123 is also stored into the RAM 101 via the bus SW 125, an IO bus 128, the PCI controller 133, the specialized I/F 134, the PCI specialized bus 4, the specialized I/F 119, the PCI controller 112, the IO bus 106 and the bus SW 103.

The compressed bitmap data stored in the RAM 101 is decompressed by a compression/decompression unit 107 via the bus SW 103 and the video bus 105. The decompressed bitmap data is outputted to the printer 3 via the IO bus 106, a video output I/F 109 and a printer image processor 114, and is print-outputted.

Further, upon image data input from the scanner 2, an original image read by the scanner 2 is processed by a scanner image processor 113, then temporarily stored into the RAM 101 via a video input I/F 108 and the bus SW 103. Further, at this time, image data may be compressed and stored into the HD 116 via the video input I/F 108, the compression/decompression unit 107, the PCI controller 112 and the HD controller 115. Note that in FIG. 2, numerals 7 and 7' respectively denote a 1-chip controller ASIC.

The CPU 104 controls the entire operation of the MFP controller 1. A ROM 102 holds a program executed by the CPU 104 and various data. A UI controller 117 controls a UI in the MFP. That is, the UI controller 117 outputs various data inputted from a UT (User Interface) 118 including a console, operation buttons and the like to the PCI bus 120, or outputs various data received via the PCI bus 120 to the UT 118.

Further, in the PDL accelerator 5, the CPU 126 controls the entire operation of the PDL accelerator 5, and a ROM 124 holds a program executed by the CPU 126 and various data.

Note that in the above description, the LAN controller 110 of the MFP controller 1 is connected to the network 111. However, the present invention is not limited to this arrangement. The network 111 may be connected to a LAN controller 132 of the PDL accelerator 5. By this arrangement, the processing load on the MFP controller 1 upon printing of PDL data received from the network 111 can be reduced. In this case, the PDL data inputted from the LAN controller 132 may be finally stored into the HD 116 of the MFP controller 1. However, in the case where the PDL accelerator 5 is provided with a hard disk and data inputted from the network 111 is temporarily stored into the hard disk, the time period in which the processing conflicts with that by the MFP controller 1 can be reduced and the entire processing efficiency of the MFP can be increased. Especially, since the PDL accelerator 5 which is often attached after the purchase of the MFP main body has a higher-speed CPU, in a case where PDL data is processed only with the accelerator 5, the entire processing is implemented at a higher speed. The same advantage is obtained in a case that the LAN controller 132 can transmit data at a speed higher than that of the LAN controller 110 of the MFP controller 1.

The MFP controller 1 and the PDL accelerator 5 according to the embodiment are interconnected via the PCI specialized bus 4. In this example, respectively 8-bit cyan (C), magenta (M), yellow (Y) and black (K) image data are transferred via the PCI specialized bus 4. Upon transmission data from the PCI controller 133, the respectively 8-bit color image data are converted to differential serial data by the specified I/F 134 of the PDL accelerator 5, and again converted to parallel data by the specified I/F 119 of the MFP controller 1. The respectively 8-bit color image data sent through the PCI specialized bus 4 are respectively serially transferred as a pair of pre-emphasized differential signals.

First Embodiment

In the following first embodiment, the transmitting side is the PDL accelerator 5, and the receiving side, the MFP controller 1. The present invention is not limited to such data transmission from the PDL accelerator 5 to the MFP controller 1. The data transmission direction may be opposite. Further, the present invention is applicable to data transmission between other devices.

Figure 3:
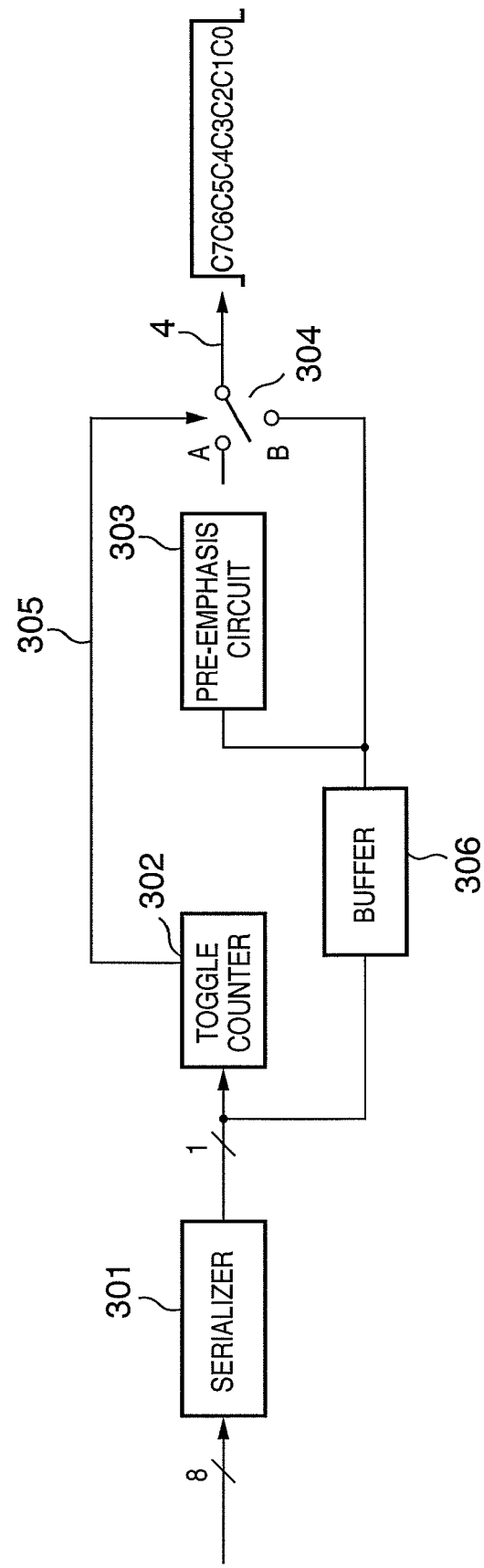
FIG. 3 is a block diagram showing a construction of a signal output port for one color in a specialized I/F on the transmitting side according to a first embodiment of the present invention.

FIG. 3 is a block diagram showing a construction of a signal output port for one color in the specialized I/F (134) on the transmitting side. Actually, the circuit is provided for the respective four colors.

A serializer 301 inputs 8-bit parallel data and converts the data to 1-bit serial data. A toggle counter 302 counts the number of toggles in a predetermined amount (e.g., 8 bits) serial data, and if the number of toggles exceeds a predetermined value S, outputs a signal 305 at a high level. A buffer 306 holds the predetermined amount of data, for matching of timing with respect to the count value by the toggle counter 302. A pre-emphasis circuit 303 emphasizes the leading and trailing edges of the serial signal, as shown in FIG. 8B. A switch 304 is connected to a terminal A in a case that the signal 305 is at the high level, and is connected to a terminal B in a case that the signal 305 is at a low level. Accordingly, if the number of toggles of the serial signal exceeds the predetermined value S, the serial signal on which pre-emphasis processing is performed by the pre-emphasis circuit 303 is outputted to the PCI bus 4. Further, in a case that the number of toggles of the serial signal does not exceed the predetermined value S, the serial signal from the buffer 306 (signal without pre-emphasis processing) is outputted to the PCI bus 4.

In this manner, in the first embodiment, it is determined on the basis of the number of leading and/or trailing edges of a transmission signal (serial signal) whether or not signal processing to emphasize the leading and/or trailing edges of the transmission signal is to be performed before transmission. Accordingly, the pre-emphasis processing is effectively implemented on high frequency data where the number of toggles where the waveform is blunted due to that signal attenuation is large, while the pre-emphasis processing is not performed on low frequency data where the bluntness of waveform is comparatively small, i.e., the number of toggles is comparatively small. In this arrangement, the increase in electric consumption by the pre-emphasis processing and the influence on radiation noise in high frequency components can be reduced.

Note that in FIG. 3, the pre-emphasis processing is not performed on low frequency data. However, the present invention is not limited to this arrangement. For example, it may be arranged such that in a case that the toggle count value is greater than the predetermined value S, the pre-emphasis function is enhanced, while in a case that the toggle count value is less than the predetermined value S, the pre-emphasis function is lowered. In this case, another pre-emphasis circuit where a pre-emphasis level is lower than that of the pre-emphasis circuit 303 may be connected between the buffer 306 and the terminal B. Otherwise, if the pre-emphasis level of the pre-emphasis circuit 303 is changeable, the pre-emphasis level of the pre-emphasis circuit 303 may be changed in correspondence with the signal 305. In this case the switch 304 can be omitted.

That is, the leading and/or trailing edges of the transmission signal can be emphasized at a level corresponding to the number of leading and/or trailing edges of the transmission signal.

Second Embodiment

Generally, in one color of image data, the change rate of lower bits of the data is higher than that of upper bits. Accordingly, in the second embodiment, upon transmission of respective color image data, it is determined based on the upper bits and the lower bits of a transmission data whether or not pre-emphasis processing is to be performed.

Figure 4:
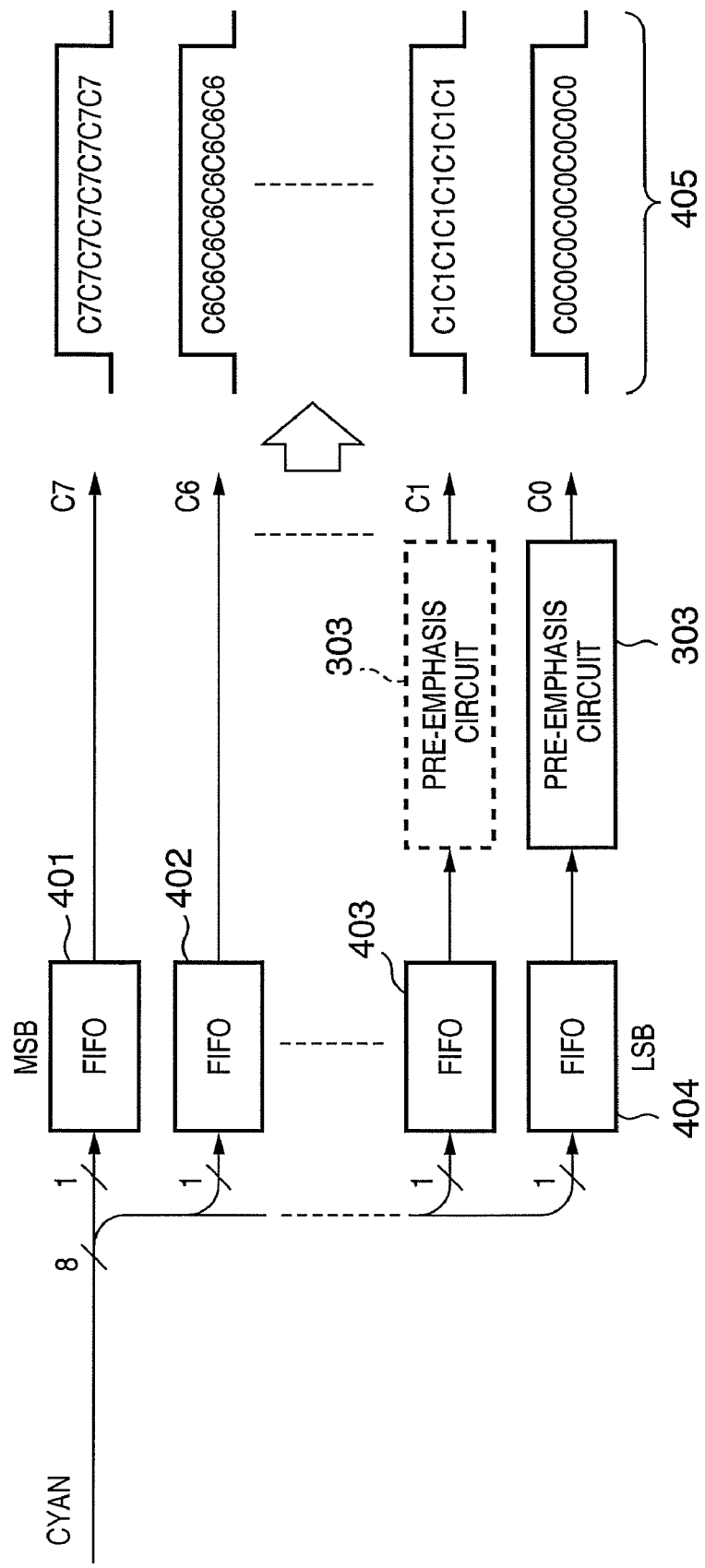
FIG. 4 is a block diagram showing a construction of the signal output port for one color in the specialized I/F on the transmitting side according to a second embodiment of the present invention.

FIG. 4 is a block diagram showing a construction of the signal output port for one color (cyan) in the specialized I/F (134) on the transmitting side according to the second embodiment of the present invention. Actually, the circuit is provided for the respective four colors (magenta, cyan, yellow and black). This circuit inputs cyan data representing one pixel by 8 bits, and serially outputs 8 pixels as one unit by bit via eight data lines. Note that the constructions of the MFP controller 1 and the PDL accelerator 5 of the second embodiment are basically the same as those in the first embodiment (FIGS. 1 and 2), the explanations of these unit will be omitted.

FIG. 4 shows a transmission circuit for image data of cyan. Numerals 401 to 404 denote 1-bit FIFO memories. The most significant bit (MSB) (C7) is sequentially inputted into the FIFO 401, then the second most significant bit (C6) is sequentially inputted into the FIFO 402. Similarly, the second least significant bit (C1) is sequentially inputted into the FIFO 403, and the least significant bit (C0) is sequentially inputted into the FIFO 404. The data input to the FIFOs and data (shift) output from the FIFOs are performed in synchronization with a pixel clock (not shown) of image data. The pre-emphasis circuit 303, which emphasizes the edges of a signal to be transmitted as in the case of the pre-emphasis circuit in FIG. 3, is provided for output of the least significant bit. However, the pre-emphasis circuit 303 may also be provided for the second least significant bit (C1), or for the higher bit position.

In this manner, in the second embodiment, the pre-emphasis processing is not performed on upper bits where the number of data changes is comparatively small, i.e., the number of toggles is comparatively small, while the pre-emphasis processing is performed on lower bits where the number of data changes is comparatively large, i.e., the number of toggles is comparatively large.

In this arrangement, the increase in electric consumption and the occurrence of high frequency component noise can be minimized with minimum execution of the pre-emphasis function.

Note that although the explanations of the circuits for image data of other color components, i.e., magenta (M), yellow (Y) and black (K) component data are omitted, the processing is performed as in the case of the cyan component.

As described above, according to the second embodiment, the pre-emphasis processing is performed only in a case that the processing is needed. Accordingly, the influence on radiation noise in high frequency components and increase in electric consumption by signal edge emphasis can be reduced.

Third embodiment

Next, a third embodiment of the present invention will be described. In the third embodiment, the execution of the pre-emphasis processing is controlled in correspondence with the characteristic of image data to be transmitted. Note that as the constructions of the MFP controller 1 and the PDL accelerator 5 of this embodiment are basically the same as those of the first embodiment (FIGS. 1 and 2), the explanations of these elements will be omitted.

Figure 5:
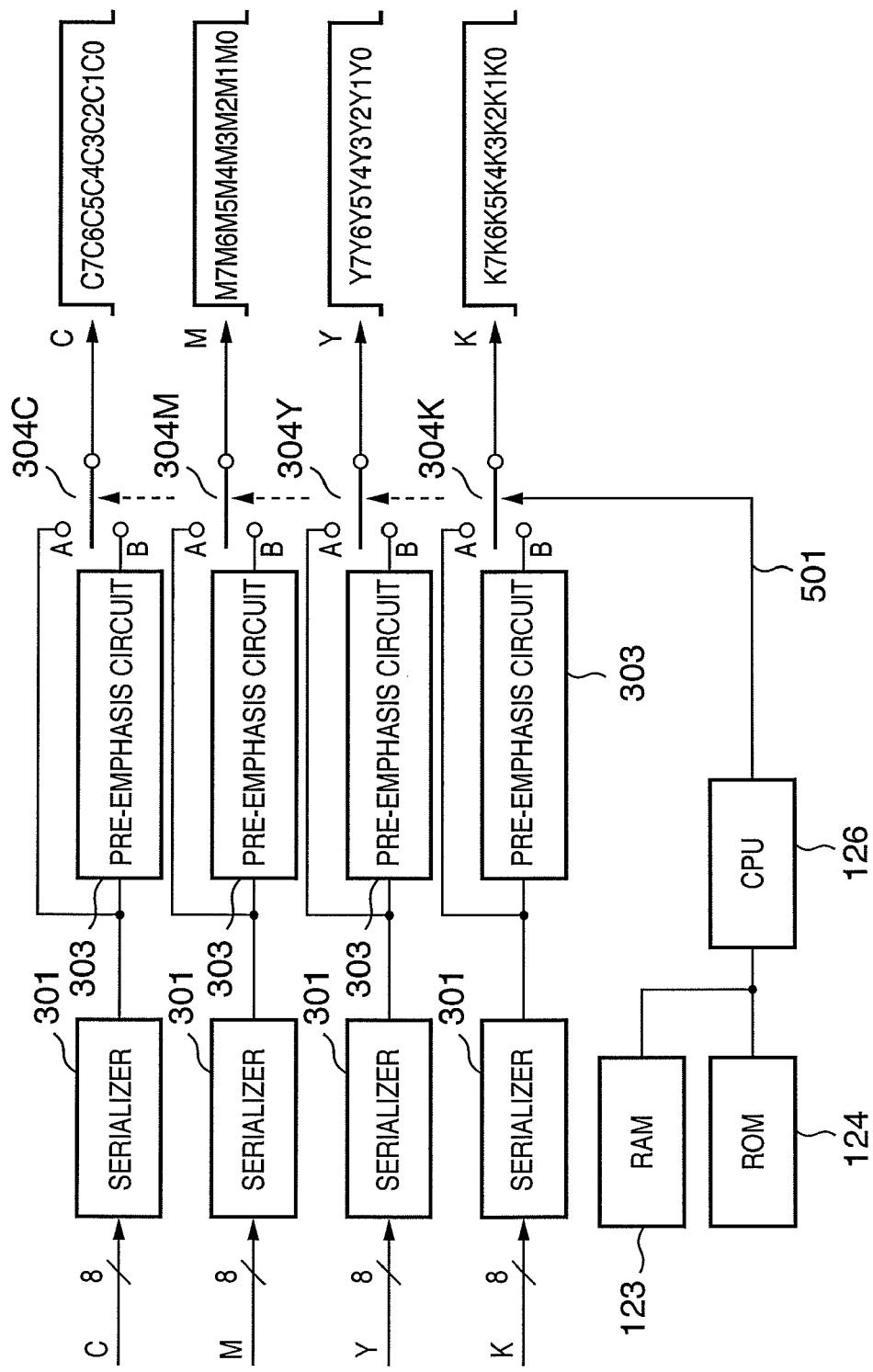
FIG. 5 is a block diagram showing a construction of a data transmission circuit of the specialized I/F according to a third embodiment of the present invention.

FIG. 5 illustrates the construction of a data transmission circuit of the specified I/F 134 according to the third embodiment. In FIG. 5, elements corresponding to those in FIGS. 2 and 3 have the same numerals, and the explanations of these elements will be omitted.

The CPU 126 of the PDL accelerator 5 causes respective switches 304C, 304M, 305Y and 304K to connect to an A-side terminal (in a case where the pre-emphasis processing is not performed) or connect to a B-side terminal (the pre-emphasis processing is performed), using a signal 501.

Figure 6:
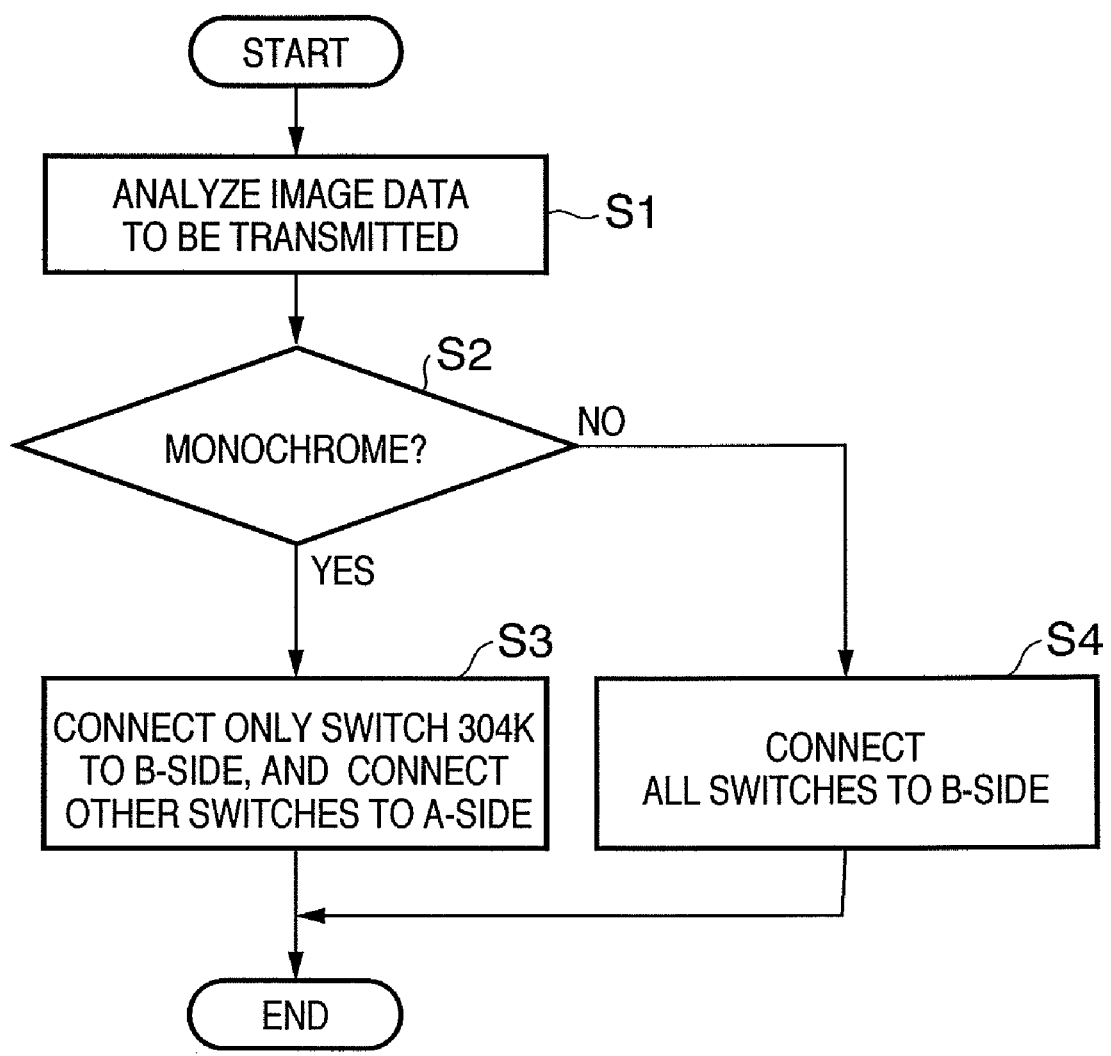
FIG. 6 is a flowchart showing processing by a CPU of the PDL accelerator according to the third embodiment.

FIG. 6 is a flowchart showing processing by the CPU 126 of the PDL accelerator 5 according to the third embodiment of the present invention. The program for execution of this processing is stored in the ROM 124.

First, at step SI, image data to be transmitted, stored in the RAM 123, is analyzed. Next, at step S2, it is determined whether or not the image data is monochrome image data. If it is determined that the image data is monochrome image data, the process proceeds to step S3, at which only the switch 304K is connected to the B-side by the signal 501, and the other switches 304C-304Y are connected to the A-side. Thus only black image data is subjected to the pre-emphasis processing while the other color (CMY) component data are not subjected to the pre-emphasis processing.

On the other hand, if it is determined at step S2 that the image data is not monochrome image data, the process proceeds to step S4, at which all the switches 304C-304K are connected to the B-side by the signal 501. Thus, all the color component data are subjected to the pre-emphasis processing and then transmitted.

Note that at step S2 where the determination as to whether or not the image data is monochrome image data is performed, it may be arranged such that it is determined whether or not the major part of the image data is monochrome data or color data. Otherwise, it may be arranged such that the image is segmented into small areas, and it is determined by each area whether or not the area is a color area or monochrome area, then if it is determined that the area is the monochrome area, only the switch 304K may be connected to the B-side in the monochrome area, and all switches 304C-304K may be connected to the A-side in the other area (color area).

Further, it may be arranged such that if it is determined that the image data is not monochrome image data, it is determined that the image is a natural image. If it is determined that the image is the natural image, only the switch 304K may be connected to the A-side while the other switches 304C, 304M and 304Y may be connected to the B-side. In this case, the C, M and Y components are subjected to the pre-emphasis processing but only the black component image data is not subjected to the pre-emphasis processing. In the natural image, as it is anticipated that the amount of black component image data is small and the pre-emphasis of the black component image data can be omitted. The determination as to whether or not the image is the natural image (even density portion) is disclosed in, e.g., US2002/0031257A1. The publication US2002/0031257A1 discloses a method for determining whether or not a subject is an edge/character portion or a portion (even density portion) of the natural image.

In this manner, in the third embodiment, it is determined by color component of image signal, in correspondence with the characteristic of image signal, whether or not a signal subjected to processing to emphasize the leading and/or trailing edges of the image signal is transferred. Note that in the present embodiment, the execution/non-execution of the pre-emphasis processing is selected, however, the level of pre-emphasis function may be selected. In this case, another pre-emphasis circuit where the pre-emphasis level is lower than that of the pre-emphasis circuit 303 is connected between the serializer 301 and the terminal A. Otherwise, if the pre-emphasis level of the pre-emphasis circuit 303 is changeable, the pre-emphasis level may be changed in correspondence with the signal 501. That is, the level of signal processing to emphasize the leading and/or trailing edges of an image signal can be changed by color component of the image signal, based on the characteristic of the image signal.

Fourth Embodiment

Next, a fourth embodiment of the present invention will be described. In the fourth embodiment, the technique for selecting the execution/non-execution of the pre-emphasis processing in the first embodiment or the technique for selecting the execution/non-execution of the pre-emphasis processing in the third embodiment can be selected. Note that the technique for selecting the execution/non-execution of the pre-emphasis processing in the first embodiment is to select the execution/non-execution of the pre-emphasis processing in accordance with the number of toggles of image data to be transmitted. The technique for selecting the execution/non-execution of the pre-emphasis processing in the third embodiment is to select the execution/non-execution of the pre-emphasis processing in accordance with the type of image data to be transmitted. Note that as the constructions of the MFP controller 1 and the PDL accelerator 5 of the fourth embodiment are basically the same as those of the first embodiment (FIGS. 1 and 2), the explanations of these elements will be omitted.

Figure 7:
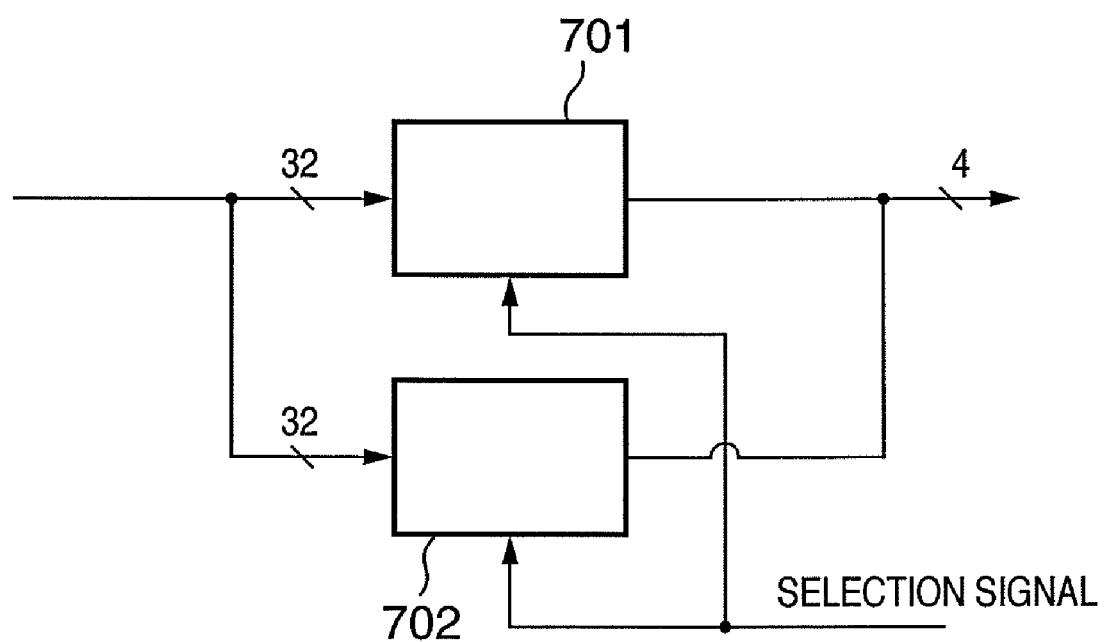
FIG. 7 is a block diagram showing a schematic construction of the data transmission circuit of the specialized I/F according to a fourth embodiment of the present invention.

FIG. 7 is a block diagram showing a schematic construction of the data transmission circuit of the specialized I/F 134 according to the fourth embodiment of the present invention.

In FIG. 7, numeral 701 denotes a circuit which selects the execution/non-execution of the pre-emphasis processing by color, based on the number of toggles of the color component data of image data to be transmitted, according to the above-described first embodiment. Further, numeral 702 denotes a circuit which selects the execution/non-execution of the pre-emphasis processing by color, in correspondence with type of image data, according to the above-described third embodiment.

In correspondence with type of image to be transmitted or an instruction by e.g. a user, a selection signal 703 is outputted from e.g. the CPU 126, for selecting the circuit 701 or the circuit 702.

Further, it may be arranged such that the circuit 701 in FIG. 7 is used as a circuit for performing the processing according to the second embodiment, and the circuit 702, as a circuit for processing the processing according to the third embodiment, and one of the circuits 701 and 702 can be selected in correspondence with the selection signal 703.

However, in this case, as the output of the second embodiment is 8 bits, the circuit 701 respectively outputs upper bits (C4 to C7) and lower bits (C0 to C3) of 8 pixels. As the output data format of the circuit 701 is different from that of the circuit 702, another control signal line to transmit a selection signal indicating the data format is required between the specified I/F 119 and the specified I/F 134.

In this manner, the level of pre-emphasis on a serial data line can be controlled by selecting one of at least two methods, and the electric consumption and radiation noise in high frequency components can be reduced.

As described above, according to the embodiments, the pre-emphasis processing can be performed only in a case that the pre-emphasis processing is required, thus the influence by radiation noise in high frequency components and electric consumption by emphasis of signal edges can be reduced.

Further, the present invention is not limited to the apparatus of the above-described embodiments, but can be applied to a system constituted by a plurality of devices or to an apparatus comprising a single device. Further, the object of the present invention can also be achieved by providing a storage medium holding software program code for performing the functions according to the above-described embodiments to a system or an apparatus, reading the program code with a computer (e.g., CPU, MPU) of the system or apparatus from the storage medium, then executing the program.

In this case, the program code read from the storage medium realizes the functions according to the embodiments, and the storage medium holding the program code constitutes the invention. The storage medium, such as a floppy (registered trademark) disk, a hard disk, an optical disk, a magneto-optical disk, a CD-ROM, a CD-R, a DVD, a magnetic tape, a non-volatile type memory card, and ROM can be used for providing the program code. Further, there is no limitation on the form of implementation of the functions of the embodiments by execution of the program code read by the computer. That is, the present invention includes a case where an OS or the like working on the computer performs a part or entire actual processing in accordance with designations of the program code and realizes the functions according to the above embodiments.

Furthermore, the present invention also includes a case where, after the program code read from the storage medium is written in a function expansion board which is inserted into the computer or in a memory provided in a function expansion unit which is connected to the computer, a CPU or the like contained in the function expansion board or unit performs a part or entire process in accordance with designations of the program code and realizes the functions of the above embodiments.

The present invention is not limited to the above embodiments and various changes and modifications can be made within the spirit and scope of the present invention. Therefore, to appraise the public of the scope of the present invention, the following claims are made.

This application claims the benefit of Japanese Application No. 2005-039520, filed on Feb. 16, 2005 which is hereby incorporated by reference herein in its entirety.

What is claimed is:

1. A transmission apparatus comprising:
a pre-emphasis unit that emphasizes one or more edges of a signal corresponding to transmission data;
a counting unit that counts a number of the one or more edges of the signal during a predetermined time period; and
a transferring unit that transfers the signal and the one or more edges emphasized by the pre-emphasis unit, if the number of the one or more edges is greater than a predetermined value, and that transfers the signal without the one or more edges emphasized by the pre-emphasis unit, if the number of the one or more edges is less than or equal to the predetermined value.

2. A transmission method comprising:
a pre-emphasis step of emphasizing one or more edges of a signal corresponding to transmission data;
a counting step of counting a number of the one or more edges of the signal during a predetermined time period; and
a transferring step of transferring the signal emphasized in the pre-emphasis step, if the number of the one or more edges of the signal is greater than a predetermined value, and transferring the signal without the one or more edges emphasized in the pre-emphasis step, if the number of the one or more edges of the signal is less than or equal to the predetermined value.

3. A transmission apparatus comprising:
a transmission unit that transmits image data including a plurality of components in parallel; and
a pre-emphasis unit that selectively emphasizes one or more edges of a signal corresponding to a black component of the image data, or one or more edges of one or more signals corresponding to one or more of the plurality of components of the image data other than the black component.

4. A transmission method comprising:
a transmission step of transmitting image data that includes a plurality of components in parallel; and
a pre-emphasis step of selectively emphasizing one or more edges of a signal corresponding to a black component of the image data, or one or more edges of one or more signals corresponding to one or more of the plurality of components of the image data other than the black component.

* * * * *